Feb. 12, 1963 R. E. LOUDON 3,077,589

READ-OUT SYSTEM

Filed Oct. 28, 1957 4 Sheets-Sheet 1

United States Patent Office 3,077,589

Patented Feb. 12, 1963

3,077,589

READ-OUT SYSTEM

Robert E. Loudon, Los Angeles, Calif., assignor to Clary Corporation, San Gabriel, Calif., a corporation of California Filed Oct. 28, 1957, Ser. No. 692,881

7 Claims. (Cl. 340—347)

This invention relates to read-out systems for electronic computing equipment and the like and has particular reference to read-out systems capable of translating information registered in a coded or combinational unit code into a decimal or single unit code.

Because of simplicity in circuitry and for other reasons, a great many electronic counters, computers, etc., count or compute and register amounts according to non-decimal systems, such as a coded decimal system, in which different amounts are registered by distinctive potentials on different combinations of several output terminals depending on the value registered. However, since numerical data is generally represented in the decimal system, certain difficulties arise in understanding and dealing with a non-decimal system and it is therefore desirable to translate any such non-decimal data into decimal data so that the values may be more readily comprehended.

It therefore becomes a principal object of he present invention to provide a novel system for translating information from a coded or combinational unit code into a decimal form.

Another object is to provide a read-out system for concurrently translating and reading out information from an electronic apparatus having a coded output.

Another object is to provide a read-out system including a device for translating and registering data from one numeral system to another in which no time delay is necessary for effecting such translation.

Another object is to provide a relatively simple and inexpensive read-out system capable of translating amounts from a coded numeral system to a decimal system.

The manner in which the above and other objects of the invention are accomplished will be readily understood on reference to the following specification when read in conjunction with the accompanying drawings, wherein.

*Counter Decade Unit*

Figure 1:
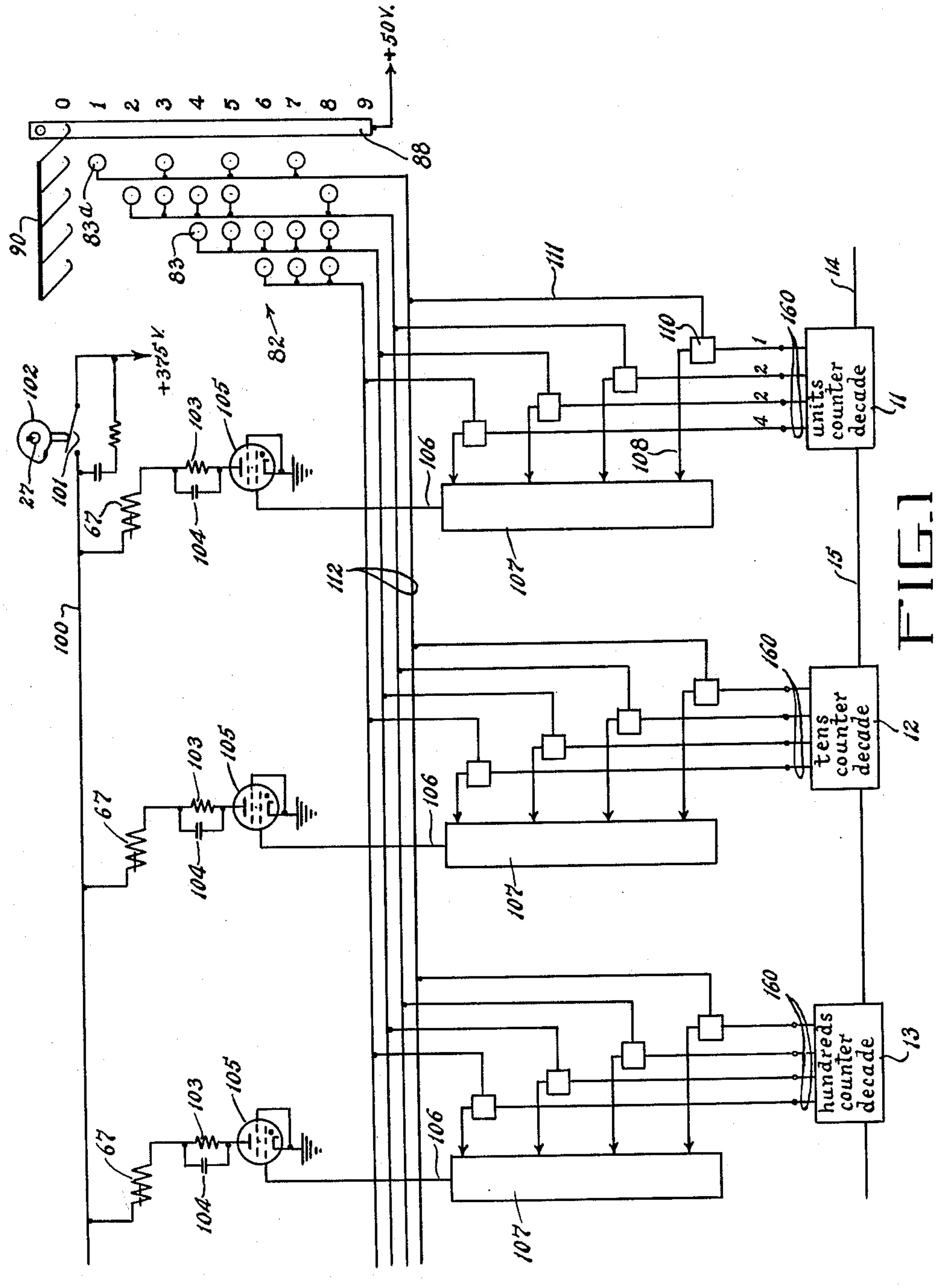
FIG. 1 is a general schematic view of a read-out system embodying the present invention.
Figure 2:
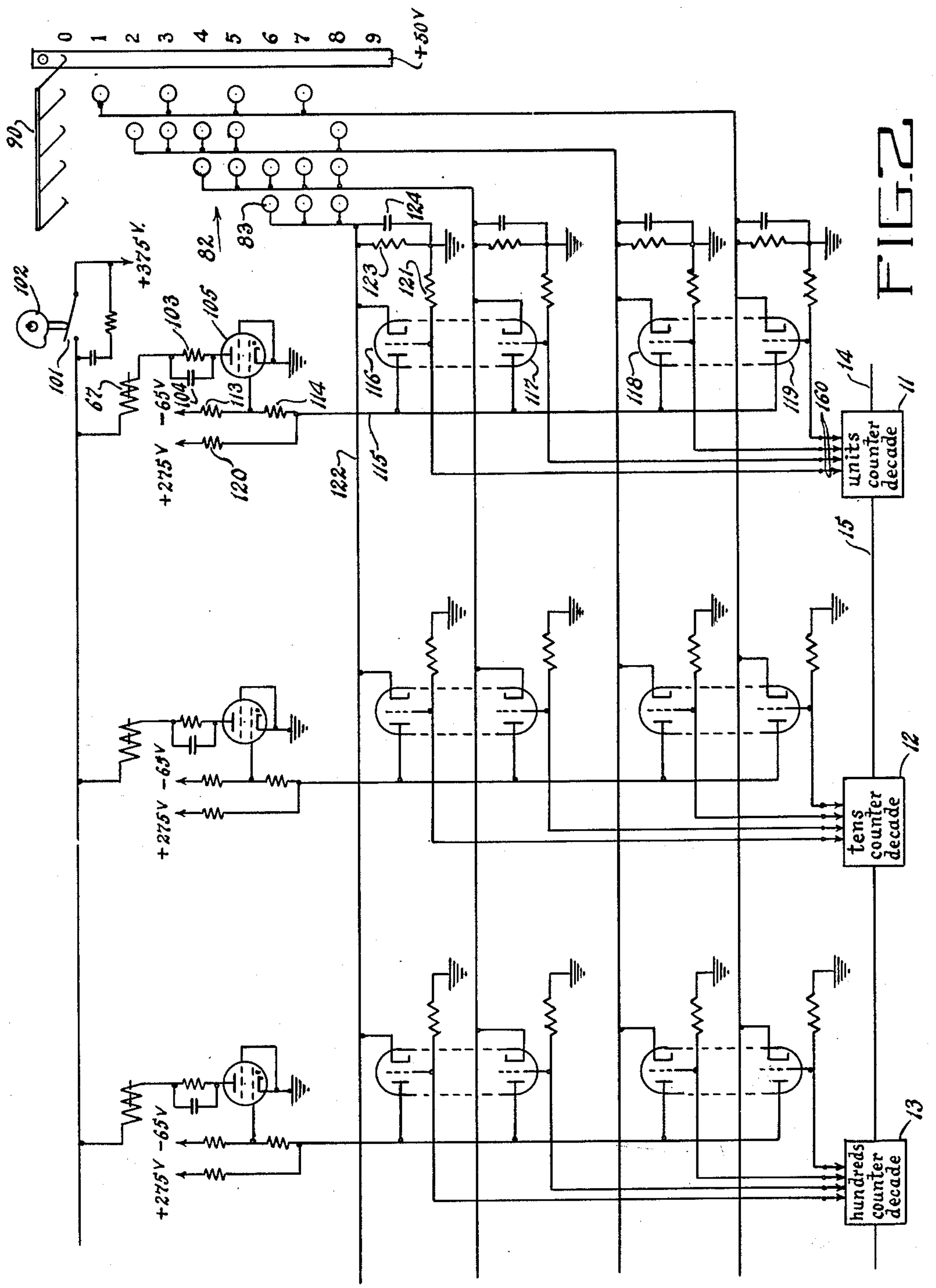
FIG. 2 is a circuit diagram illustrating the electrical controls for the present read-out system.

The present read-out system is disclosed, by way of example, in connection with an electronic counter of the coded decimal type comprising decimally arranged decades 11, 12 and 13 (FIGS. 1 and 2). Pulses to be counted are applied over an input line 14 and are fed into the units counter decade 11. Suitable circuit arrangements transfer a carry-over or transfer pulse from one decade to the next through a line, i.e. 15, upon accumulation of ten pulses.

Each of the counter decades has four output terminals 160 which register, counting from the right, the weighted values 1, 2, 2 and 4. By registering distinctive potentials on different ones of combinations of such terminals, any decimal values from "0" to "9" may be represented.

The following table indicates the relation between various possible coded amounts registered by each decade and the corresponding decimal digit value:

| Terminal | | | | Decimal Value |
|---|---|---|---|---|
| 4 | 2 | 2 | 1 | |
| 0 | 0 | 0 | 0 | 0 |
| 0 | 0 | 0 | 1 | 1 |
| 0 | 0 | 1 | 0 | 2 |
| 0 | 0 | 1 | 1 | 3 |
| 0 | 1 | 1 | 0 | 4 |
| 0 | 1 | 1 | 1 | 5 |
| 1 | 1 | 0 | 0 | 6 |
| 1 | 1 | 0 | 1 | 7 |
| 1 | 1 | 1 | 0 | 8 |
| 1 | 1 | 1 | 1 | 9 |

In the above case, the distinctive potential applied to any output terminal of the decade is assumed to be 0 volt and the normal potential is assumed to be minus 20 volts.

*Read-Out Machine*

Figures 3, 4:
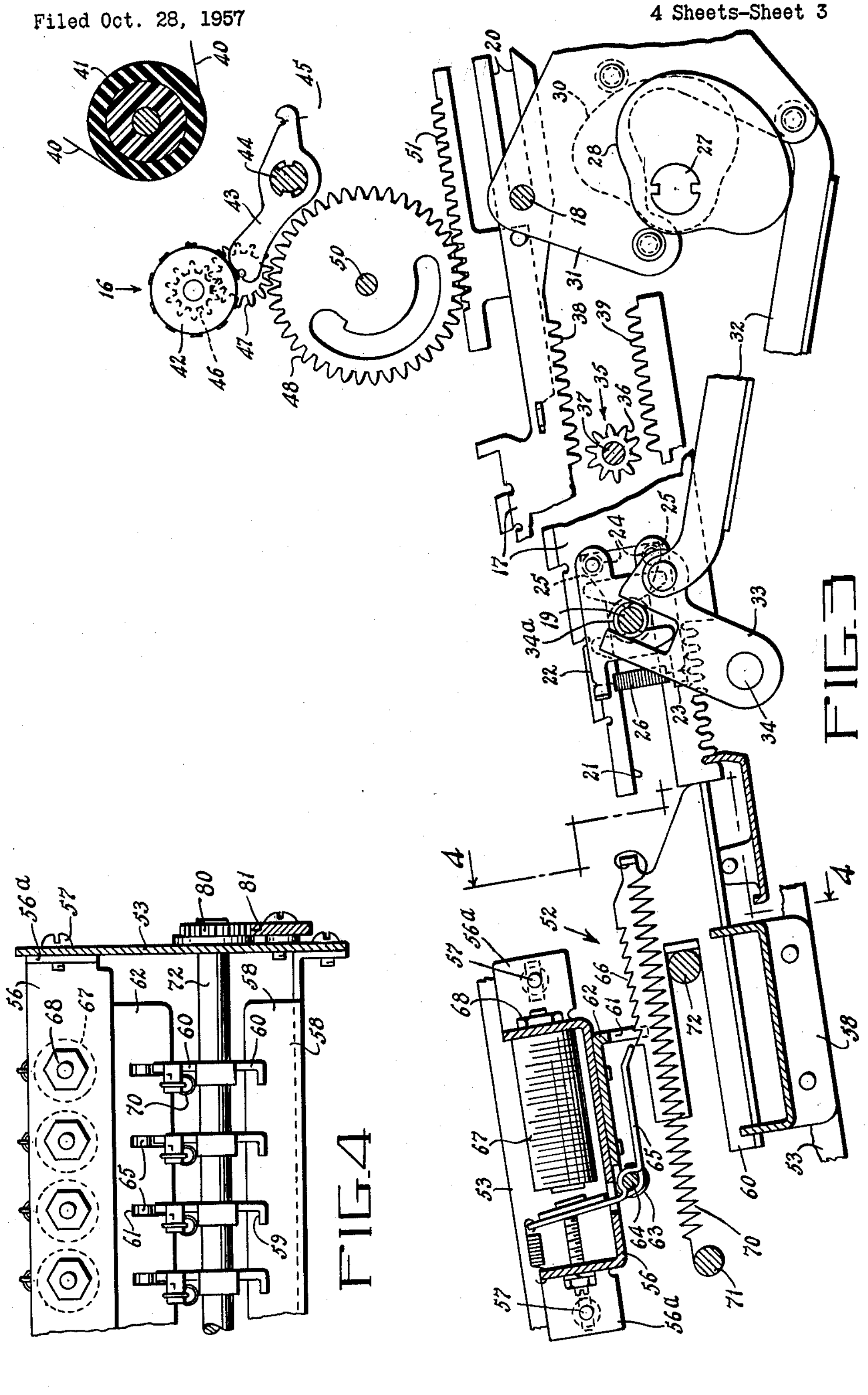
FIG. 3 is a sectional view, with parts broken away, of the read-out machine.
FIG. 4 is a transverse sectional view of the rack stop unit and is taken substantially along the line 4—4 of FIG. 3.

The read-out machine, illustrated partly in FIG. 3, is basically similar to the commercially available Clary addding machine which is disclosed in the R. E. Boyden Patent No. 2,583,810, issued on January 29, 1952. The details of the accumulator, generally indicated at 35, may be found in the E. P. Drake Patent No. 2,472,696, issued on June 7, 1949. Details of the printer mechanism, generally indicated at 16 and its entrainment with the actuator racks 17 of the machine, may be found in the Busch et al. Patent No. 2,744,682, issued on May 8, 1956.

Since the basic structure of the machine is disclosed in the above patents, only those portions which are related to the present invention will be disclosed in detail. However, it is to be understood that the invention is not limited to the particular type of machine disclosed.

The read-out machine includes a plurality of racks 17, located in diffeent denominational orders of the machine. The latter are guided for fore and aft movement by shafts 18 and 19 which are embraced by guide slots 20 and 21, respectively, in each rack. The shaft 18 is stationary, but the shaft 19 is moved fore and aft of the machine, once during each cycle, and for this purpose, is suitably guided by the machine side frames (not shown).

The shaft 19 is yieldably connected to each rack by a pair of opposed drive pawls 22 and 23. The latter carry rollers 24 which are normally held in depressions 25 formed on opposite edges of the rack slot 21 by a tension spring 26 extending between forwardly extending tails on the pawls. Whenever a rack is arrested, the rollers 24 ride out of their associated depressions and along the edges of the slot 21.

The machine is driven by a rotatable drive shaft 27 operated by a motor driven cyclically operable clutch (not shown). A pair of complementary cams 28 and 30 are keyed in juxtaposition on the shaft 27 and are engaged by rollers carried on a cam follower 31 which is fulcrumed on the stationary shaft 18 and is connected by a link 32 to a bifurcated arm 33. The latter is fixed on a rock shaft 34 which extends across the machine and is secured to a similar bifurcated arm on the opposite end. These arms, i.e. 33, embrace rollers, i.e. 34*a*, rotatably mounted on opposite ends of the shaft 19 so as to cause parallel fore and aft movement of the shaft during the machine cycle.

*Accumulator*

The accumulator 35 comprises, in general, a series of denominationally arranged gears 36 independently and rotatably mounted on an accumulator shaft 37. The accumulator is normally maintained in its neutral position illustrated in FIG. 3, but is raised or lowered, by means not shown, to mesh the accumulator gears with the upper or lower rack gear sections 38 and 39, respectively, on the various racks, depending upon the type of operation to be performed. During normal entry operations, the accumulator is raised or lowered into mesh with the associated rack gear section at the start of a machine cycle and before the racks are advanced to the left. Thereafter, and before the racks are returned from advanced positions, the accumulator is returned to its illustrated neutral position. Thus, each accumulator gear nominally registers an amount corresponding to the number of increments through which the rack 17 is advanced during a cycle. Tens transfer mechanism (not shown) is provided to advance a higher order accumulator gear one increment when the next lower order gear has completed one revolution.

*Printer*

The various values represented by the numerical positions to which the racks 17 are advanced are printed on a paper tape 40 which is fed around a platen 41 to a printing station where a value represented by the positioning of the racks is printed.

The printer 16 comprises a series of numeral printing wheels 42, each operatively entrained with an associated one of the racks 17. Each printer wheel has spaced around its periphery a series of digit type ranging in value from "0" to "9." Each printer wheel is rotatably mounted on a separate printing arm 43 which is loosely keyed on a printer control shaft 44 and is urged clockwise by a tensioned spring 45. A gear 46 integral with each printer wheel meshes with a gear 47 also rotatably mounted on the arm 43. Except during printing operations, the arms 43 are held by the shaft 44 in their illustrated positions wherein the gears 47 mesh with idlers 48 which are independently and rotatably mounted on the fixed support shaft 50. The idlers 48 continuously mesh with offset rack sections 51 carried by the racks 17.

After the various racks have been advanced to different digitized positions and before their return, the printer control shaft 44 is rocked clockwise, by means not shown, permitting the springs 45 to carry those arms which would otherwise be allowed to do so, to rock clockwise to effect printing. The shaft 44 is then returned to its original position to return the gears 47 into mesh with the idlers 48 before the racks are returned. Therefore, the printer wheels 42 register amounts corresponding to the numerical positions to which the racks 17 advance.

*Read-Out Controls*

Figures 5, 6, 7, 8, 9:
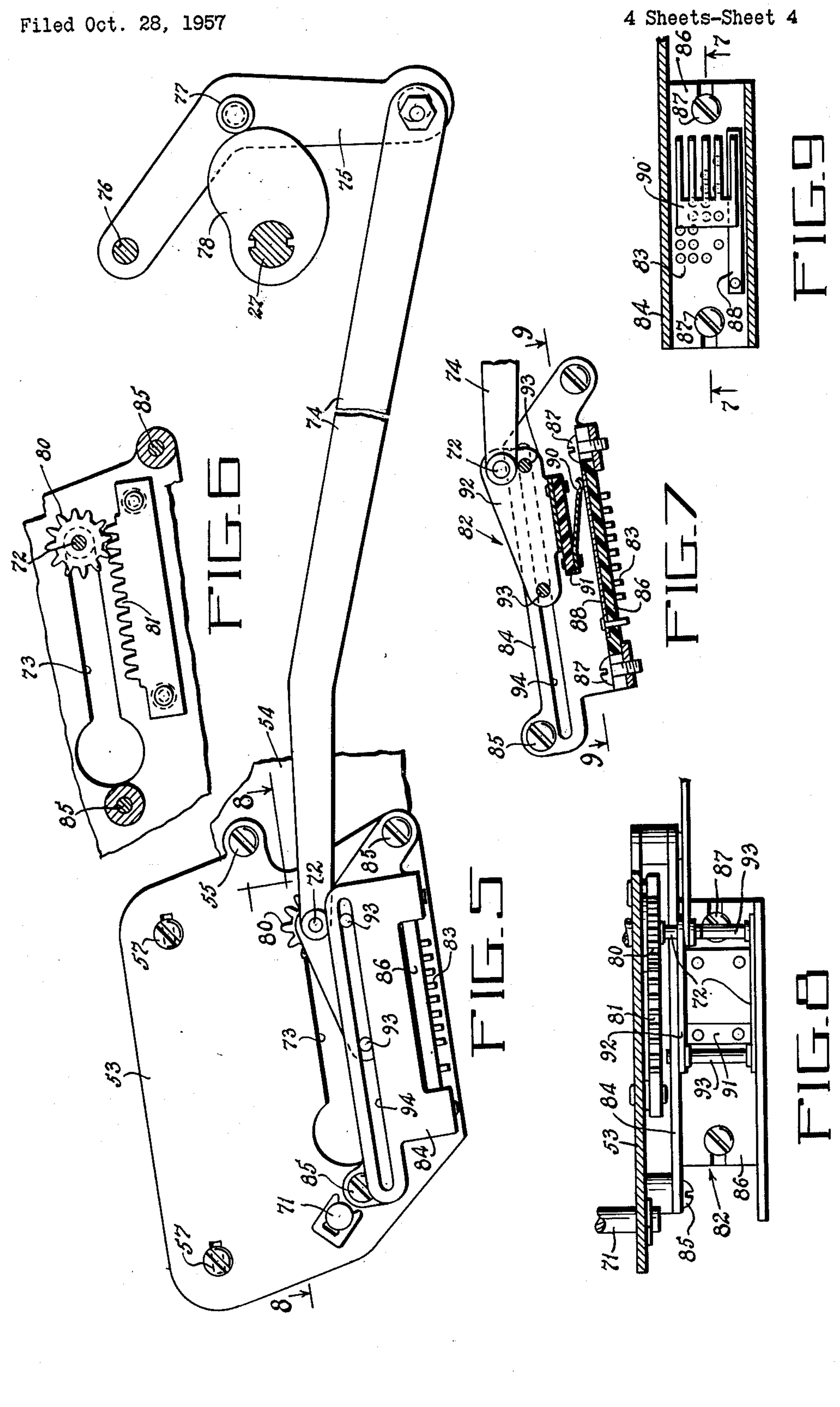
FIG. 5 is a side view of the rack stop control mechanism.
FIG. 6 is a side view illustrating the means for causing parallel movement of the rack stop slide control shaft.
FIG. 7 is a sectional view of the scanning switch and is taken along line 7—7 of FIG. 9.
FIG. 8 is a sectional plan view of the scanning switch taken along line 8—8 of FIG. 5.
FIG. 9 is a sectional plan view of the scanning switch and is taken substantially along the line 9—9 of FIG. 7.

Means are provided for arresting the various racks 17 in any of the numerical positions through which they pass during their forward advance. For this purpose, a rack arresting unit, generally indicated at 52, is provided. The latter comprises side frame plates, one of which is shown at 53 (FIG. 5) secured to the machine side frames, i.e. 54, by screws 55. A U-shaped cross brace 56 extends between the side plates 53 and is adjustably secured thereto by clamp screws 57 which extend through elongated slots in the side plates and are threaded into ears 56*a* extending from the cross brace. A second U-shaped cross brace 58 extends between the plates 53 and is suitably attached thereto.

Denominationally arranged rack stop slides 60 are provided in the rack stop unit. Such slides are L-shaped in cross section (see FIG. 4) and are guided in L-shaped guide slots 59 in the cross brace at their lower edges and in guide slots 61 in a brace member 62 at their upper edges. The latter brace is suitably secured to the under surface of the cross brace 56 and has fingers formed into bent-over bearings 63 supporting a pivot rod 64. Stop pawls 65 are pivoted on the rod 64 and cooperates with a series of stop teeth 66 formed on the associated stop slide 60, the teeth being spaced apart distances equal to the spacing between the teeth of the rack sections 38 and 39. The upper end of each pawl 65 forms the armature of an electromagnet 67, the core of which is adjustably attached by a threaded connection 68 to the rear ledge of the cross brace 56.

The various stop slides 60 are urged forwardly by tension springs 70 extending between ears on the slides and a cross rod 71. Normally, however, the slides are held in their rearward illustrated positions, wherein they abut forward ends of respective ones of the racks 17, by a control shaft 72. The latter shaft is guided at opposite ends thereof in elongated guide slots, like slot 73 (FIG. 6), formed in the side plates 53.

Means are provided for advancing the shaft 72 substantially in time with, but slightly ahead of, the rack drive shaft 19 whereby to permit the stop slides 60 to follow until arrested by respective pawls 65. For this purpose, the shaft 72 is connected by a link 74 to the lower end of a cam follower 75 which is fulcrumed at 76 and urged clockwise by a suitable spring (not shown) to maintain a roller 77 thereon in engagement with a cam 78 keyed on the drive shaft 27.

In order to maintain parallel movement of the shaft 72 throughout its fore and aft travel, the latter has fastened at opposite ends thereof a gear, like gear 80 (FIG. 6), which meshes with a rack, like rack 81, suitably secured to the respective side frame plate 53.

A scan switch, generally indicated at 82 (FIGS. 1, 2, 7, 8 and 9) is provided to successively scan a matrix of various contacts 83 which are arranged in a pattern depending on the manner in which the outputs of the various counter decades are arranged, as will be more fully described hereinafter.

The scan switch comprises a U-shaped frame 84 attached by screws 85 to one of the side plates 53. The bottom of the frame 84 has an opening therein which is bridged by plate 86 of insulating material in which the various contacts 83 are embedded. It should be noted at this point that the contacts 83 are spaced in rows along the length of the plate 86 at the same pitch as the pitch of the various teeth on the rack sections 38, 39 and 51 of the various racks. The plate 86 is adjustably secured to the bottom of the frame 84 by clamp screws 87 which extend through elongated slots in the plate 86.

A conductor strip 88 is embedded in the plate 86 alongside the contacts 83, and the contacts and strip are arranged to be bridged by a scanning brush 90 (FIGS. 7 and 9) attached to a plate 91 of insulating material, which, in turn, is attached to the bottom of a U-shaped brush carrier 92. The latter is slideably fitted within frame 84. Cross pins 93 are guided in elongated slots 94 in the frame 84 whereby to guide the brush 90 along the various contacts. The carrier 92 has bearings therein which embrace the shaft 72 causing the carrier to move in time with the shaft and thereby the stop slides 60.

The construction of the read-out machine per se is disclosed and claimed in the copending application of K. F. Oldenburg et al., Serial No. 698,510, filed November 25, 1957.

The manner in which the various racks 17 of the read-out machine are differentially arrested under control of respective ones of the various counter decades may perhaps be best understood by first referring to FIG. 1.

Only three counter decades and corresponding orders of the machine are illustrated in FIG. 1. However, it is to be understood that many more such counter decades and corresponding machine orders may be provided.

The left hand ends of the various electromagnets 67 are connected through a common line 100 and normally open switch 101 to a source of plus 375 volt supply. The switch 101 is controlled by a cam 102 operatively connected to the shaft 27 and effective to close the switch 101 at the commencement of a cycle and to reopen the switch after the shafts 19 and 72 have advanced leftward in FIG. 3 to their fullest extents and before they return.

The right hand end of each electromagnet 67 is connected through parallel connected resistance 103 and capacitor 104 to the anode of a thyratron or gaseous tube 105. This may, for example, be of the type commercially known as Type 2D21. The cathode of the tube is connected to ground and the control grid or igniter is connected to the output line 106 of an "and" gate, generally indicated at 107.

Four input circuits, like circuit 108, are connected to the gate 107, each input circuit being connected to a respective one of the output terminals 160 of the corresponding counter decade through a gate or switch device 110.

In this particular disclosure, the "and" gate is sensitive to low potentials applied to all inputs thereof. If all output terminals 160 are at low potential, representative of zero registration of the corresponding counter decade, the "and" gate will apply a positive potential of sufficiently high value to fire the tube 105. Thus, when the switch 101 is closed, the tube 105 will complete a circuit to the magnet 67, energizing the latter and thereby blocking the associated rack stop slide 60 in home or zero position.

If one or more of the input terminals of the "and" gate are of relatively high potential indicative of registration of a value corresponding to a decimal digit other than "0," the "and" gate will remain closed and its output line at low potential. It is therefore only when all inputs of the "and" gate are rendered low in potential, either because of a low potential output of each terminal of the counter decade or because of application of a relatively high potential to the switch circuit, i.e., 110, of an input circuit which would otherwise be at high potential. In the latter case, application of a high potential to the gate 110 is effective to lower the potential of such input circuit 108 and thus accomplish the same result as if the corresponding decade terminal 160 were low in potential. For this purpose, the control circuit for each gate 110 is connected through a line, like 111, to a respective row of contacts 83. Normally, when the machine is in its home position wherein all of the racks are in their zero positions, the scanning brush 90 is out of engagement with all contacts 83. Accordingly, the "and" gate 107 will fire tube 105 only if the respective counter decade represents a zero wherein all terminals thereof present a low potential.

If, for example, the counter decade registers 0001, i.e., the equivalent of a decimal digit 1, and wherein the right hand terminal only presents a high or distinctive potential of 0 volt and the remaining three terminals present low potential of minus 20 volts, the output of the "and" gate would be held to a low positive potential insufficient to overcome the bias on the thyratron thereby preventing conduction of the tube 105. When the machine is started, the stop slide 60 and rack 17 in the corresponding order will advance to their No. 1 positions. At this point, a plus 50 volt potential will be transmitted from a positive potential source, through conductor 88, brush 90, and a single contact 83*a* to the lowermost gate 110, causing the potential in the associated input circuit 108 for the "and" gate to drop. Since all input circuits for the "and" gate are now at low potential, the latter will be effective to cause its tube 105 to fire, energizing magnet 67 to arrest its corresponding stop slide 60 and associated rack 17.

If, on the other hand, the counter decade registered an amount corresponding to the decimal digit "7," the two left hand terminals 160 and the rightmost terminal would represent a high potential, in accordance with the preceding table. Accordingly, only the second from the bottom input circuit 108 for the gate 107 would be low and the remaining input circuits would be high. As the machine cycles, one or more of the remaining circuits are rendered high, but this would be of no effect until the brush 90 reached the No. 7 position wherein a high potential would be applied to all gates 110 except the second from the bottom. Accordingly, all "and" gate inputs would be at low potential and the tube 105 would fire.

The gating circuit of the "and" gates associated with all other counter decades are connected in parallel to the various rows of contacts 83 through trunk lines 112 and therefore operate in the same manner as that described above.

FIG. 2 illustrates a detailed circuitry embodying an "and" gate arrangement controlled by a counter decade and the scan switch 82. The same reference numerals are applied to elements similar to those shown in FIG. 1.

The igniter of tube 105 is normally held below its critical firing point by connection to a minus 65 volt supply through a one megohm resistor 113. The igniter is also connected through 2.4 megohm resistor 114 to an anode line 115 which is connected to the anodes of opposite triodes 116, 117, 118 and 119 of two vacuum tubes of the type commercially known as Type 5963. A source of plus 275 volts is connected through a one megohm resistor 120 to the anode line 115 and is effective, when none of the triodes 116 to 119 are conducting, to raise the potential of the igniter of tube 105 above its firing point.

The grids of the various triodes are connected to respective ones of the terminals 160 of the respective counter decade, i.e. 11. Each grid is also connected to ground through a one megohm resistor, i.e. 121.

The cathodes of all upper triodes, i.e. 116, associated with all counter decades, are connected through a common line 122 to the higher order row of scan switch contacts 83. Likewise, the cathodes of all similar remaining triodes are connected through common lines to corresponding rows of the contacts 83.

Such common lines, i.e. 122, are each connected to ground through resistors, i.e. 123, and capacitors, i.e. 124, connected in parallel with each other.

When a counter decade registers zero, all output terminals will present minus 20 volts to the corresponding grids of the four associated triodes. Accordingly, all such triodes will be held non-conducting, causing the voltage of anode line 115 to rise and the tube 105 to accordingly conduct when the switch 101 is closed. If, however, one or more of the output terminals 160 registers a relatively high or "0" voltage, the relation between the grid of the triode and its cathode will be such as to cause the triode to conduct, lowering the potential of the anode line 115 to such a value that the tube 105 will not conduct. In such case, when the rack drive mechanism advances to a numerical position corresponding to the decimal value represented by the condition of the respective counter decade, the scanning brush 90 will transmit plus 50 volts through the associated contacts 83 to the cathodes of those conducting triodes, causing the same to extinguish and thereby raise the potential of the anode line 115 sufficiently to fire the tube 105 and thereby arrest the rack in the corresponding order of the machine.

After the rack drive mechanism, including rack drive shaft 19, has been fully advanced, during which time all of the racks have been either arrested at different numerical positions or will have advanced to their No. 9 positions, the cam 102 will break the circuits to the electromagnets 67 so that the scanning brush 90 may return to its home position without further affecting the system.

Although I have described my invention in detail in its preferred embodiment and have therefore used certain specific terms and languages herein, it is to be understood that the present disclosure is illustrative rather than restrictive and that certain changes and modifications may be made without departing from the spirit or scope of the claims appended hereto. For example, it is intended that the term "registering device" be considered any device capable of registering a value such as an accumulator or printer. Also, in lieu of applying the read-out system to the output of a counter, it could be applied, with obvious modification, to the output of a computer, punched card reader, punched tape reader or the like.

Having thus described the invention, what I desire to secure by United States Letters Patent is:

1. A read-out system for an apparatus having a plurality of denominationally arranged decades, each of said decades comprising a plurality of terminals which indicate different amounts by combinations of distinctive potentials on different ones of said terminals, respectively, comprising the combination of a plurality of denominationally arranged registering devices differentially movable into different digit representing positions, means for advancing said registering devices, a matrix of contacts arranged in patterns in accordance with the possible combinations of distinctive potentials on said terminals of each of said decades, a scanning device for said contacts, means operable in concert with said advancing means for effecting relative scanning movement between said scanning device and said patterns of contacts, and means responsive to said scanning device upon scanning a pattern of one or more of said contacts corresponding to the one or ones of said terminals of any of said decades having distinctive potentials thereon for arresting the said registering device associated with said last mentioned decade.

2. A read-out system for translating amounts registered by an apparatus in accordance with a numeral system other than the decimal system, said apparatus having a plurality of denominationally arranged decades, each of said decades comprising a plurality of terminals which indicate different amounts by combinations of distinctive potentials on different ones of said terminals, respectively, comprising the combination of a plurality of denominationally arranged registering devices differentially movable into different decimal digit representing positions, means for advancing said registering devices, a matrix of contacts arranged in patterns in accordance with said other numeral system, a scanning device for said contacts, means operable in concert with said advancing means for effecting relative scanning movement between said scanning device and said patterns of contacts, and means responsive to said scanning device upon scanning a pattern of one or more of said contacts corresponding to the one or more of said terminals of any of said decades having distinctive potentials thereon for arresting the said registering device associated with said last mentioned decade.

3. A read-out system for translating amounts registered by an apparatus in accordance with a numeral system other than the decimal system, said apparatus having a plurality of denominationally arranged decades, each of said decades comprising a plurality of terminals which indicate different amounts by combinations of distinctive potentials on different ones of said terminals, respectively, comprising the combination of a plurality of denominationally arranged registering devices differentially movable into different decimal digit representing positions, means for advancing said registering devices an arresting device for each of said registering devices, a plurality of "and" gates, means for applying the outputs of said "and" gates to respective ones of said arresting devices, a plurality of input circuits for each of said "and" gates, means for connecting each of said input circuits to a respective one of said terminals of a respective one of said decades, a matrix of contacts arranged in a number of rows equal to the number of said terminals of each of said decades, said contacts being arranged in said rows in accordance with said other numeral systems, a scanning device for scanning said rows of contacts, means operable in concert with said advancing means for effecting relative scanning movement between said scanning device and said rows of contacts, and input circuit modifying devices connected between respective ones of said rows of contacts and different ones of said input circuits, each of said circuit modifying devices being effective to apply a said distinctive potential to its respective input circuit when a contact in a respective row is scanned by said scanning device.

4. A read-out system for translating amounts registered by an apparatus in accordance with a numeral system other than the decimal system, said apparatus having a plurality of denominationally arranged decades, each of said decades comprising a plurality of terminals which indicate different amounts by combinations of distinctive potentials on different ones of said terminals, respectively, comprising the combination of a plurality of denominationally arranged registering devices differentially movable into different decimal digit representing positions, means for advancing said registering devices, an arresting device for each of said registering devices, a plurality of "and" gates means for applying the outputs of said "and" gates to respective ones of said arresting devices, a plurality of input circuits for each of said "and" gates, means for connecting each of said input circuits to a respective one of said terminals of a respective one of said decades, circuit modifying devices for respective ones of said input circuits, and means operable in concert with said advancing means for actuating said circuit modifying devices in accordance with said other numeral system, each of said circuit modifying devices being effective when actuated to remove a said distinctive potential from its respective input circuit.

5. A read-out system for transferring amounts registered by an apparatus in accordance with a numeral system other than the decimal system, said apparatus having a plurality of denominationally arranged decades, each of said decades comprising a plurality of terminals which indicate different amounts by combinations of distinctive potentials on different ones of said terminals, respectively, comprising the combination of a plurality of denominationally arranged registering devices differentially movable into different decimal digit representing positions, means comprising differential actuators for respective ones of said registering device; means for advancing and retracting said acutaors, devices for arresting respective ones of said actuators during advancement thereof, a plurality of "and" gates, means for applying the outputs of said "and" gates to respective ones of said arresting devices, a plurality of input circuits for each of said "and" gates, means for connecting each of said input circuits to a respective one of said terminals of a respective one of said decades, circuit modifying devices for respective ones of said input circuits, means operable in concert with said advancing means for actuating said circuit modifying devices in accordance with said other numeral system, each of said circuit modifying devices being effective when actuated to remove a said distinctive potential from its respective input circuit, and means operable during retraction of said actuator by said advancing means for rendering said arresting means ineffective.

6. A read-out system for an apparatus having a plurality of denominationally arranged decades, each of said decades comprising a plurality of terminals which indicate decimal digits by combination of distinctive potentials on different ones of said terminals, respectively, comprising the combination of a plurality of registering devices differentially movable into different digit representing positions, means for advancing said registering devices, a matrix of contacts arranged in patterns in accordance with the possible combinations of distinctive potentials on the terminals of each of said decades, a scanning device for said contacts, means operable in concert with said advancing means for effecting relative scanning movement between said scanning device and said patterns of contacts, and means responsive to said scanning device upon scanning a pattern of one or more of said contacts corresponding to the one or more of said terminals on any of said decades having distinctive potentials thereon for arresting the said actuator associated with said last mentioned decade.

7. A read-out system for translating amounts registered by an apparatus in accordance with a numeral system other than the decimal system, said apparatus having a plurality of denominationally arranged decades, each of said decades comprising a plurality of terminals which indicate different amounts by combinations of distinctive potentials on different ones of said terminals, respectively, comprising the combination of a plurality of registering devices differentially movable into different decimal digit representing positions, means for advancing said registering devices, electromagnetic devices for arresting respective ones of said registering devices during advancement thereof, a plurality of "and" gates, each of said gates comprising a plurality of electron tubes, each of said tubes having an anode, a grid and a cathode; means for applying the anodes of the tubes in each of said gates in series to a respective one of said arresting devices, means connecting said grids to said terminals of a respective decade, a matrix of contacts arranged in a number of rows equal to the number of said terminals of each of said decades, said contacts being arranged along said rows in accordance with said other numeral system, means connecting the said contacts in each of said rows to respective cathodes in each of said "and" gates, a source of high potential, and means operable in concert with said advancing means for successively connecting said source to different said contacts along said rows whereby to cause respective ones of said tubes to become non-conducting when a respective said registering device registers an amount corresponding to an amount registered by the respective one of said decades.

References Cited in the file of this patent

UNITED STATES PATENTS

| | | |
|---|---|---|
| 2,318,591 | Couffignal | May 11, 1943 |
| 2,770,415 | Lindesmith | Nov. 13, 1956 |
| 2,827,626 | De Motte | Mar. 18, 1958 |
| 2,895,124 | Harris | July 14, 1959 |